May 24, 1960 R. N. QUENNEVILLE 2,937,730
CLUTCH MECHANISM FOR AIRCRAFT ENGINE STARTER
Filed April 9, 1958 2 Sheets-Sheet 2

INVENTOR.
RAYMOND N. QUENNEVILLE
BY
Teller & McCormick
ATTORNEYS

United States Patent Office 2,937,730
Patented May 24, 1960

2,937,730

CLUTCH MECHANISM FOR AIRCRAFT ENGINE STARTER

Raymond N. Quenneville, Holyoke, Mass., assignor to United Aircraft Corporation, East Hartford, Conn., a corporation of Delaware Filed Apr. 9, 1958, Ser. No. 727,370

9 Claims. (Cl. 192—103)

This invention relates to an improved clutch mechanism for connecting a rotary driving member with a rotary driven member which mechanism is particularly adaptable for use in a gas propelled starter for an aircraft engine or the like.

It is the general object of the present invention to provide a clutch mechanism of the type described which includes engageable and disengageable clutch parts, the said clutch parts to be maintained in engagement so as to drivingly connect the rotary driving member with the rotary driven member when the said members are at rest, the said clutch parts to be disengaged when speed of the rotary driven member exceeds the speed of the rotary driving member, and the said clutch parts to be engageable during rotation of the rotary driving and rotary driven members.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
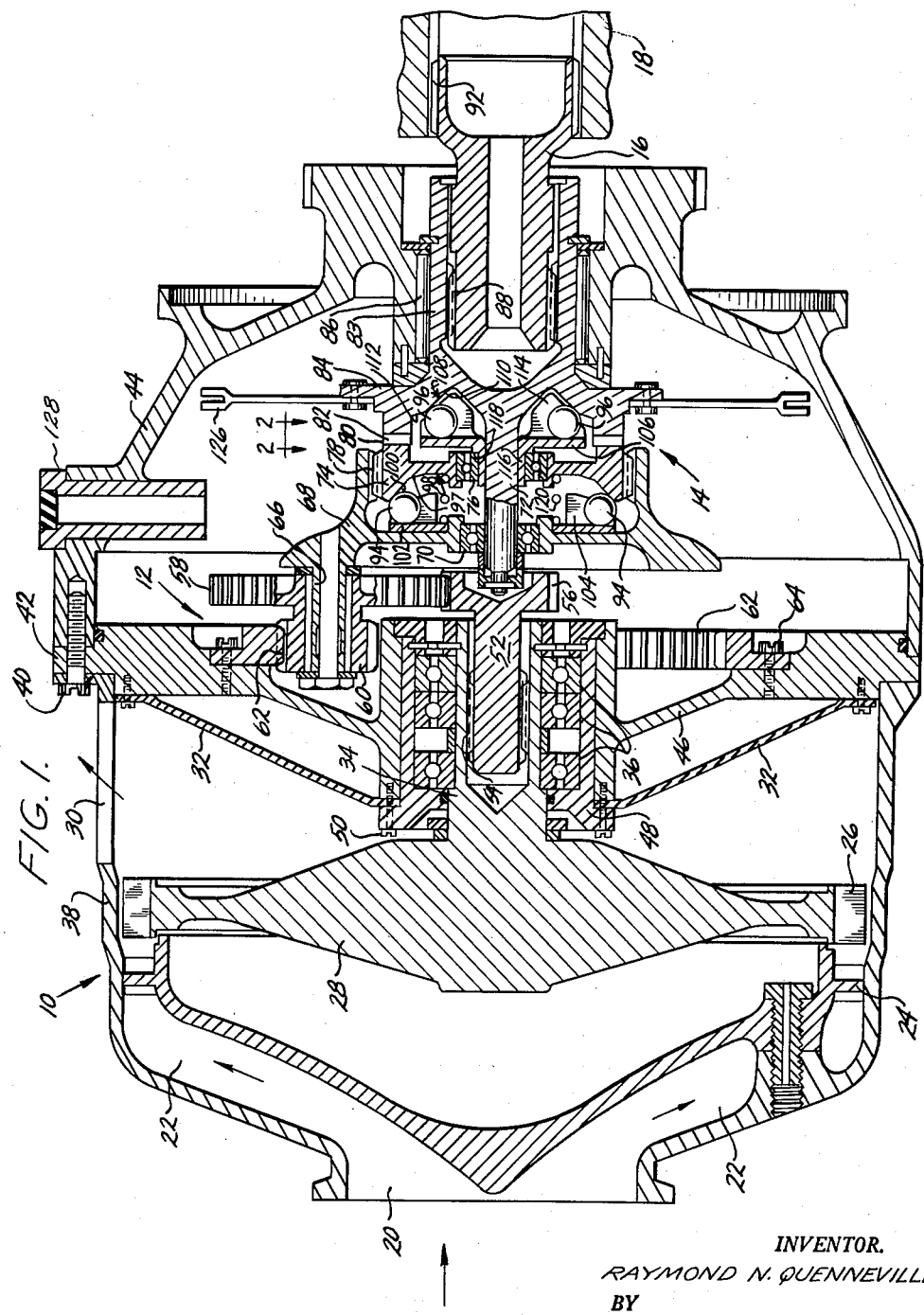
Fig. 1 is a longitudinal section of a gas propelled starter showing the improved clutch mechanism.

The improved clutch mechanism is illustrated in a gas propelled starter comprising a power section indicated generally at 10, a reduction unit indicated generally at 12, the clutch mechanism indicated generally at 14, and a starter output shaft 16 for driving an aircraft engine which is indicated generally at 18. The power unit 10 comprises an intake opening 20 in the starter housing and which communicates with an annular chamber 22 and into which pressurized gases are introduced. The said gases may be compressed air, high temperature combustion products, or gases from any form of gas generator. From the annular chamber 22, the pressurized gases are directed by a plurality of nozzles 24, 24 against blades 26, 26 of a turbine rotor 28. The gases discharged from the turbine blades 26, 26 are exhausted from the starter through a discharge opening 30, an annular baffle 32 being provided for directing the said gases to the discharge opening 30 and for preventing their introduction to the reduction unit 12. The turbine rotor 28 is formed integrally with a shaft 34 which extends therefrom and which is mounted centrally of the starter by means of ball bearing units 36, 36.

The bearing units 36, 36 are supported in a generally cylindrical starter housing which is built up of a plurality of bolted-together sections. A first end section 38 of the starter housing which encloses the power unit 10 is connected by bolt 40 and others not shown to a middle section 42 and to a second end section 44. The middle section 42 of the starter housing includes an inwardly extending wall 46 in which there is centrally secured a bearing support ring 48 for the ball bearing units 36, 36. The baffle 32 is supported by and attached to the housing wall 46 and the bearing support ring 48 by the bolts 50, 50.

A stub shaft 52 is splined at one end at 54 to the turbine shaft 34 and carries a gear 56 at its opposite end. The gear 56 meshes with a plurality of planetary gears 58, only one of which is shown. Each of the gears 58 has formed integrally therewith a coaxial gear 60 and each of the gears 60 meshes with a stationary internal ring gear 62. The ring gear 62 is connected to the inwardly extending housing wall 46 by a bolt 64 and others not shown. The gears 58 and 60 are rotatably supported on shafts 66 only one of which is shown. The shafts 66 are formed integrally on a member 68 which is supported on a ball bearing unit 70 for rotation about a shaft 72.

An axially movable clutch part 74, which is supported on a ball bearing unit 76 for rotation about the shaft 72 with the member 68, is connected to said member preferably by spiral splines 78 formed on the outer periphery of the clutch part and internally on the said member. In preferred form, the movable clutch part 74 is provided with teeth 80 on its face adapted to engage complementary teeth 82 carried by another clutch part 84. The clutch part 84 is formed integrally with the shaft 72 and has an integrally formed hollow hub 83 which is supported for rotation in the housing section 44 on roller bearings 86, 86. The clutch hub 83 is splined to the starter output shaft 16 as indicated at 88. The said output shaft is splined at its other end at 92 to the aircraft engine indicated generally at 18.

Rotation of the turbine rotor 28 by propellant gases will, through the gear train 56, 58, 60 and 62, rotate the member 68 and the movable clutch part 74 connected thereto. When the clutch part 74 is positioned axially so that the teeth 80 thereon drivingly engage the complementary teeth 82 carried by the other clutch part 84, the said other clutch part, the output shaft 16, and the aircraft engine will be rotated by said movable clutch part. Thus, the member 68 constitutes a rotary driving member which is connected by the clutch mechanism 14 with the output shaft 16 which constitutes a rotary driven member.

In accordance with the present invention, the clutch mechanism 14 includes radially movable means revoluble with the rotary driving member 68 and operatively associated with first cam means for urging the movable clutch part 74 into engagement with the clutch part 84. The clutch mechanism also includes radially movable means revoluble with the rotary driven member or output shaft 16 and operatively associated with second cam means for urging the movable clutch part 74 out of engagement with the clutch part 84. There is also provided spring means for urging the movable clutch part 74 into engagement with the clutch part 84.

In preferred form, a first plurality of balls 94, two of which are shown, constitutes the radially movable means urging the movable clutch part 74 into engagement and a second plurality of balls 96, two of which are shown, constiutes the radially movable means urging said movable clutch part out of engagement. The first cam means with which the plurality of balls 94 is operatively associated is preferably an inclined cam surface 97 formed on the movable clutch part 74 and having angularly related first and second or inner and outer portions 98 and 100, the second or outer portion 100 being disposed radially outwardly from the first or inner portion 98. A ball support ring 102 is preferably provided and may have formed thereon a plurality of fins 104, 104, one each for the balls 94. The ring 102 is rotatable with the rotary driving member 68, the fins thereon assisting revolution of the balls 94 about the axis of the clutch mechanism. The balls 94 are movable radially of the clutch mechanism between the ring 102 and the cam surface 97 and are urged radially outwardly by centrifugal force into engagement with said ring and cam surface when the driving member 68 is rotated and the said balls thereby revolved.

The balls 96 are movable radially between a support ring 106 and a cam surface 108 at the urging of centrifugal force generated by rotation of the clutch part 84 and the rotary driven member or output shaft 16. The cam surface 108 which constitutes the second cam means is preferably formed on the clutch part 84 and preferably includes angularly related first and second or inner and outer portions 110 and 112, the second or outer portion 112 being disposed radially outwardly from the first or inner portion 110. The angle of inclination of the inner portion 110 of the cam surface 108 is similar to the angle of inclination of the outer portion 100 of the cam surface 97 and the angle of inclination of the outer portion 112 of the cam surface 108 is similar to that of the inner portion 98 of the cam surface 97. The reasons for the provision of cam surfaces having two angularly related portions and for the interrelation of the angles of inclination of the cam surfaces will be discussed hereinafter.

The support ring 106 has formed thereon a plurality of fins 114 adapted to assist in the revolution of the balls 96 about the axis of the clutch mechanism and said ring is rotatable with the clutch part 84. An axially extendng annular flange 116 on the ring 106 serves as a mount for the bearing units 76 which supports the movable clutch part 74 and the said flange slidably engages the shaft 72 which is integral with the said clutch part. A small annular shoulder 118 formed on the ring 106 engages one end of the inner race of the bearing unit 76. When the balls 96, 96 are urged radially outwardly by centrifugal force and engage the support ring 106 and the cam surface 108, the said ring is urged against the bearing unit 76 whereby to urge the movable clutch part 74 out of engagement with the clutch part 84. It has been found that connection between the annular flange 116 of the support ring 106 and the shaft 72, as by key, is unnecessary. The friction created between the said flange and shaft by pivotal action resulting from the axial force exerted on the ring 106 by the balls 96 serves to insure rotation of the ring with the shaft and yet allows the required axial sliding movement of the ring along the shaft.

The spring means for urging the movable clutch part 74 into engagement with the clutch part 84 comprises, in preferred form, a light coil spring 120 which is seated at one end on the support ring 102 for the balls 94 and at the opposite end on the said movable clutch part.

When neither the starter nor the aircraft engine are operating and the member 68 and the output shaft 16 are stationary, the movable clutch part 74 is urged axially into the engaged position as shown in Fig. 1 by the spring 120. The balls 94 and the balls 96 are ineffective to axially position the said clutch part due to the absence of centrifugal force acting thereon and are in repose between their respective support rings and cam surfaces, the upper balls being positioned downwardly from the positions shown in Fig. 1 by gravitational forces.

Upon the introduction of propellant gases to the inlet opening 20 of the starter and the commencement of rotation of the turbine rotor 28, the gears 56, 58 and 60, and the member 68, the clutch part 74 will drive the clutch part 84, the output shaft 16 and the aircraft engine 18. The balls 94 and the balls 96 will thereupon begin to revolve and all of said balls will be moved radially outwardly by centrifugal force to the positions shown in Fig. 1. Since the balls 94 are located further from the axis of revolution than are the balls 96, they exert a greater axial force on the clutch part 74. The said clutch part 74 is, therefore, maintained in positive engagement with the clutch part 84 during the time that the starter accelerates the aircraft engine to the required starting speed. When the aircraft engine has started, the flow of propellant gases to the starter is interrupted by suitable timing or speed responsive mechanism, not shown, and the clutch mechanism 14 is disengaged as described hereinbelow.

Figure 2:
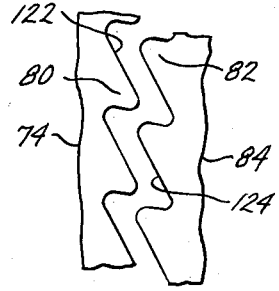
Fig. 2 is a view along the line 2—2 of Fig. 1 showing the clutch teeth.

Disengagement of the clutch parts 74 and 84 is provided for in the slope of the rear surfaces of the clutch teeth 80 and 82. That is, the teeth 80 and 82, which are generally saw-tooth in form and complementary as mentioned heretofore, are capable of driving engagement in only one direction and exert axial clutch disengaging forces when the speed of the clutch part 84 exceeds that of the clutch part 74. As best illustrated in Fig. 2, the slopes of the rear surfaces 122 and 124 of the teeth 80 and 82 are complementary and are inclined in the normal driving direction, i.e., clockwise rotation as viewed from the left-hand end of the starter. It will be seen that when the teeth 82 begin to advance relative to the teeth 80 as a result of acceleration of the aircraft engine subsequent to starting thereof, the rear surfaces of the teeth 82 will act on the rear surfaces of the teeth 80 to urge the movable clutch part 74 axially whereby to disengage the said clutch teeth. The angle of the spiral splines 78 connecting the member 68 and the movable clutch member 74 is preferably complementary to the angles of the teeth 80 and 82 and thus aids in the engagement and disengagement of said teeth.

Figure 3:
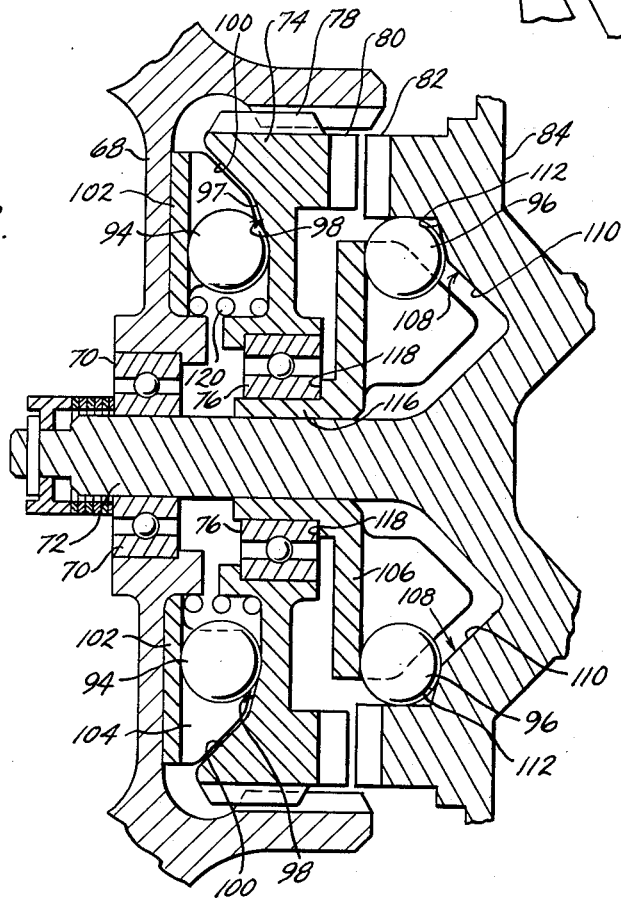
Fig. 3 is an enlarged detail view of the clutch mechanism taken from Fig. 1, but showing the clutch disengaged with the driving and driven members rotating.

Referring to Fig. 3, it will be seen that as the clutch part 74 is urged out of engagement with the clutch part 84 by the teeth 80 and 82, the balls 94 are forced radially inwardly and the balls 96 are allowed to move radially outwardly. As illustrated in Fig. 3, with the clutch disengaged and with both clutch parts 74 and 84 rotating, the balls 94 and the balls 96 are positioned at substantially equal distances from the axis of revolution thereof, the cam surfaces 97 and 108 being suitably inclined and the support rings 102 and 106 being suitably spaced therefrom to provide for such location of the said balls. With the balls 94 and the balls 96 so located, the axial force exerted by the balls 96 on the clutch part 74 is greater than the axial force exerted thereon by the balls 94 since the speed of rotation of the aircraft engine and the clutch part 84 is greater than the speed of rotation of the clutch part 74. Thus, the balls 96 positively maintain the clutch in the disengaged condition while the aircraft engine is operating. As the starter decelerates, the balls 94 will, of course, exert progressively less force on the clutch part 74 and when rotation of the starter ceases, the upper ball 94 will be moved downwardly from the position shown by gravity and will come to rest on the spring 120.

When operation of the aircraft engine is terminated, the clutch mechanism 14 automatically re-engages and is thus conditioned for a subsequent start of the engine. As the engine decelerates, the axial force exerted by the balls 96 on the movable clutch part 74 decreases. At some very low speed, the force of the engaging spring 120 overcomes the force exerted by the balls 96 and the said balls are forced radially inwardly along the cam surface 108 whereby to allow the movable clutch part 74 to engage the clutch part 84.

In addition to the operations of the clutch mechanism 14 described above, the said mechanism is adapted to engage during a running start, i.e., when operation of the engine starter is initiated with the aircraft engine rotating at a speed below its starting speed. Under these conditions, the clutch parts 74 and 84 will be disengaged as shown in Fig. 3 with the balls 96 revolving and the balls 94 at rest. When propellant gases are supplied to the startter and rotation of the elements of the power and reduction units 10 and 12 of the starter commences, the member 68 will be rotated and the balls 94 revolved thereby. As the balls 94 begin to revolve, they will be urged radially outwardly to the positions in which they are shown in Fig. 3. As described above, the balls 94 and 96 are substantially equidistant from their axis of revolution with the clutch disengaged and, therefore, the axial forces exerted thereby on the movable clutch part 74 are determined respectively by the speeds of rotation of the starter and the engine or more specifically by the speeds of rotation of the clutch parts 74 and 84. As the starter accelerates, the axial force exerted by the balls 94 increases correspondingly and when the force exerted by the balls 94 and the force of the engaging spring 120 equals and begins to exceed the force exerted by the balls 96, the movable clutch part 74 will be urged into engagement with the clutch part 84. It is to be noted that with a relatively light spring 120, the speeds of the clutch parts 74 and 84 will be very nearly equal when engagement takes place and, thus, ratcheting of the clutch teeth 80 and 82 will not be appreciable. Further note is to be taken, in this connection, of the effect of movement of the balls 94 and 96 which takes place during the clutch engaging operation. As the clutch part 74 commences its engaging movement, the balls 94 are allowed to move radially outwardly to the positions shown in Fig. 1 and the balls 96 are forced radially inwardly to the positions shown in Fig. 1. It will be seen that the radial movement of the balls results in a rapid increase in the effective clutch engaging force and accomplishes a fast snap-action engagement which further reduces ratcheting of the clutch teeth.

While the cam surfaces 97 and 108 each include angularly related inner and outer portions, it is to be understood that the invention is not so limited. Each of the cam surfaces 97 and 108 may take the form of a single plane inclined with respect to both axial and radial planes and the said cam surfaces may also take other forms within the scope of the invention. The particular form of cam surface shown is advantageous from the standpoint of the clutch re-engaging operation which occurs as the engine coasts to a standstill after shut-off and from the standpoint of size and weight considerations.

It will be apparent that the angles of inclination of the cam surfaces 97 and 108 with respect to radial or axial planes determine the magnitude of the axial component of the centrifugal force of the balls 94 and 96. Thus, a ball engaging a cam surface having a relatively small angle of inclination with respect to an axial plane will exert a relatively small axial force thereon for a given centrifugal force. Conversely, a ball engaging a cam surface having a larger angle of inclination with respect to an axial plane will exert a much larger axial force on the surface for the same centrifugal force.

In order that ratcheting be minimized during the aforesaid clutch re-engaging operation which occurs after termination of engine operation, it is desirable that the clutch part 74 be held in the disengaged position until the speed of the aircraft engine has decreased to a very low level. From the foregoing, it will be seen that the lowest possible clutch re-engaging speed will be obtained with the use of a cam surface having the largest possible angle of inclination with respect to an axial plane. That is, the force of the spring 120 will overcome the force of the balls 96 at a much lower speed when the angle of inclination of the cam surface 108 engaged by said balls is large with respect to an axial plane than when said angle of inclination is small with respect to an axial plane. There is, of course, a limit on the angle of inclination which may be provided on the cam surface 108. It will be apparent that if the said angle is very large so that the cam surface 108 falls substantially within a radial plane, the friction between the balls 96 and the said cam surface will be prohibitive. The spring 120 would then be incapable of forcing the balls 96 radially inwardly so as to engage the clutch even when rotation of the engine and revolution of the balls had ceased entirely. An angle of about 74° from an axial plane has been found to provide a desirably low clutch re-engaging speed with a minimum of ratcheting and the friction encountered with such an angle is not prohibitive.

It will be seen that with the cam surface 108 having an angle of inclination of the order of 74° the said surface must be of considerable length in order that the balls 96 moving therealong may allow appreciable axial movement of the movable clutch part 74. A relatively long cam surface dictates a clutch mechanism of rather large diameter and of considerable weight, mechanism characteristics which are highly undesirable in the field of aircraft design. For this reason, the cam surface 108 is preferably formed to include the inner and outer portions 110 and 112 and only the portion 112, which is engaged by the balls 96 when the clutch is disengaged, is arranged at the approximately 74° angle of inclination. The inner portion 110 of the cam surface 108 which the balls 96 engage when the clutch parts 74 and 84 are engaged is arranged at a considerably smaller angle with respect to an axial plane so that a relatively small radial movement of the said balls will allow the movable clutch part 74 to be axially displaced the distance required for engagement of the teeth 80 and 82. An angle of approximately 45° with an axial plane has been found suitable for the inner portion 110 of the cam surface 108.

The cam surface 97 is formed to correspond to the cam surface 108 and since the balls 94 engage the outer portion 100 thereof when the ball 96 engages the inner portion 110 of the cam surface 108, as explained above, the said outer portion 100 is arranged at an angle similar to the angle of the inner portion 110. Similarly, the inner portion 98 of the cam surface 97 is arranged at an angle similar to the angle of inclination of the outer portion 112 of the cam surface 108.

Additional components of the starter, only incidentally related, however, to the clutch mechanism of the present invention, comprise an oil slinger 126 and an oil filler tube 128. The oil slinger 126 is connected to the clutch part 84 for rotation therewith and for distributing oil maintained in the starter housing in order to provide oil mist lubrication for the various moving parts of the starter. The starter housing is sealed by suitable packings for maintaining oil therein which is introduced through the filler tube 128.

The invention claimed is:

1. A clutch mechanism for connecting a rotary driving member with a rotary driven member comprising a toothed clutch part continuously connected with and rotated by the rotary driving member, another toothed clutch part connected with the rotary driven member, said first mentioned clutch part being movable axially into and out of engagement with said other clutch part and the teeth of said clutch parts being complementary and generally saw-tooth in form with the slope of the rear surfaces thereof providing for disengagement of the clutch parts when the speed of the rotary driven member exceeds that of the rotary driving member, first radially movable means revoluble with said movable clutch part and arranged to apply force to the same, first cam means with a surface inclined from a radial plane operatively associated with said first radially movable means so that an axial force component is derived from the centrifugal force generated by said radially movable means and is applied to said movable clutch part for urging the same into engagement with said other clutch part, spring means for urging said movable clutch part into engagement with said other clutch part, second radially movable means revoluble with said other clutch part and arranged to apply force to said movable clutch part, and second cam means with a surface inclined from a radial plane operatively associated with said second radially movable means so that an axial force component is derived from the centrifugal force generated by said means and is applied to said movable clutch part for urging the same out of engagement with said other clutch part.

2. A clutch mechanism as set forth in claim 1 wherein the inclinations of portions of the surfaces of said first and second cam means from radial planes are substantially the same, and wherein the said first and second cam means and first and second radially movable means are otherwise constructed and arranged to provide for the application of substantially equal and opposite forces to said movable clutch part by said first and second radially movable means respectively when the speeds of said two clutch parts are substantially equal.

3. A clutch mechanism for connecting a rotary driving member with a rotary driven member comprising a toothed clutch part continuously connected with and rotated by the rotary driving member, another toothed clutch part connected with the rotary driven member, said first mentioned clutch part being movable axially into and out of engagement with said other clutch part and the teeth of said clutch parts being complementary and generally saw-tooth in form with the slope of the rear surfaces thereof providing for disengagement of the clutch parts when the speed of the rotary driven member exceeds that of the rotary driving member, first radially movable means revoluble with said movable clutch part and arranged to apply force to the same, first cam means having a surface with a first portion which is inclined from a radial plane and a second portion which is disposed radially outwardly from said first portion and which is also inclined from said radial plane but at a different angle, said first cam means being operatively associated with said first radially movable means so that an axial force component is derived from the centrifugal force generated by said radially movable means and is applied to said movable clutch part for urging the same into engagement with said other clutch part, spring means for urging said movable clutch part into engagement with said other clutch part, second radially movable means revoluble with said other clutch part and arranged to apply force to said movable clutch part, and second cam means having a surface with a first portion which is inclined from a radial plane at an angle substantially the same as the angle of inclination of said second portion of the surface of said first cam means and with a second portion which is disposed radially outwardly from said first portion and which is inclined from said radial plane at an angle substantially the same as the angle of inclination of said first portion of the surface of said first cam means, said second cam means being operatively associated with said second radially movable means so that an axial force component is derived from the centrifugal force generated by said means and is applied to said movable clutch part for urging the same out of engagement with said other clutch part.

4. A clutch mechanism comprising a driving element, a driven element and a movable member for connecting and disconnecting said elements, ratchet teeth engageable and disengageable by movement of said member for drivingly connecting said member with one of said elements, mechanism drivingly connecting said member with the other of said elements, first centrifugally actuated means rotatable with said driving element for urging said member into connecting relation with said one element, second centrifugally actuated means rotatable with said driven element for urging said member out of connecting relation with said one element, and first and second cam means operatively associated respectively with said first and second centrifugally actuated means and adapted to convert the centrifugal forces exerted thereon by said centrifugally actuated means to axial forces which are exerted on said movable member and which tend to move said member in and out-of-connecting relation with said element in the aforementioned manner, said first and second cam means being adapted also to provide for relative radial movement of said first and second centrifugally actuated means with movement of said member whereby to change the relative effectiveness of said two centrifugally actuated means.

5. A clutch as set forth in claim 4 wherein a biasing spring means is provided and acts on said movable member to urge the same into connecting relation with said one element.

6. A clutch as set forth in claim 5 wherein the ratchet teeth are for drivingly connecting the movable member with the driven element and act responsive to a reversal of driving forces between said movable member and element to force said member out of clutching engagement with said driven element and to thereby change the relative effectiveness of said first and second centrifugally actuated means.

7. A clutch as set forth in claim 4 wherein the first and second camming means are adapted to provide for increased and decreased effectiveness of said first centrifugally actuated means and decreased and increased effectiveness of said second centrifugally actuated means respectively with movement of said movable clutching member into and out of connecting relation with said one element.

8. A clutch as set forth in claim 7 wherein the first and second cam means are constructed and arranged so that the effectiveness of said first centrifugally actuated means is at least equal to the effectiveness of said second centrifugally actuated means when the said movable clutching member and said one clutching element are at equal rotative speeds.

9. A clutch as set forth in claim 7 wherein the first and second cam means are constructed and arranged so that the effectiveness of said first centrifugally actuated means exceeds the effectiveness of said second centrifugally actuated means whenever said clutch is in a driving condition.

References Cited in the file of this patent

UNITED STATES PATENTS

| | | |
|---|---|---|
| 2,047,792 | McFarlane | July 14, 1936 |
| 2,554,445 | Miller | May 2, 1951 |